(12) United States Patent
Kurita et al.

(10) Patent No.: US 12,439,411 B2
(45) Date of Patent: Oct. 7, 2025

(54) TERMINAL AND RADIO BASE STATION

(71) Applicant: NTT DOCOMO, INC., Tokyo (JP)

(72) Inventors: Daisuke Kurita, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 245 days.

(21) Appl. No.: 18/261,359

(22) PCT Filed: Jan. 15, 2021

(86) PCT No.: PCT/JP2021/001357
§ 371 (c)(1),
(2) Date: Jul. 13, 2023

(87) PCT Pub. No.: WO2022/153505
PCT Pub. Date: Jul. 21, 2022

(65) Prior Publication Data
US 2024/0306153 A1    Sep. 12, 2024

(51) Int. Cl.
*H04W 72/21* (2023.01)
*H04L 1/08* (2006.01)
*H04W 72/1273* (2023.01)
*H04W 72/232* (2023.01)

(52) U.S. Cl.
CPC ............. *H04W 72/21* (2023.01); *H04L 1/08* (2013.01); *H04W 72/1273* (2013.01); *H04W 72/232* (2023.01)

(58) Field of Classification Search
CPC . H04L 1/08; H04L 1/18; H04L 1/189; H04W 72/1273; H04W 72/21; H04W 72/232
See application file for complete search history.

(56) References Cited

U.S. PATENT DOCUMENTS

| 2020/0154467 | A1  | 5/2020 | Gong et al. |
| 2022/0095346 | A1* | 3/2022 | Khoshnevisan ...... H04L 5/0094 |
| 2023/0299906 | A1* | 9/2023 | Yuan ..................... H04L 1/1861 370/329 |

OTHER PUBLICATIONS

International Search Report issued in corresponding International Application No. PCT/JP2021/001357, mailed on Aug. 17, 2021 (6 pages).
Written Opinion issued in corresponding International Application No. PCT/JP2021/001357, mailed on Aug. 17, 2021 (3 pages).
Vivo; "Discussion on Solutions for PUCCH coverage enhancement"; 3GPP TSG-RAN WG1 #103-e, R1-209648; e-Meeting; Oct. 26-Nov. 13, 2020 (13 pages).
China Telecom; "New WID on NR coverage enhancements"; 3GPP TSG RAN meeting #90e, RP-202928; Electronic Meeting; Dec. 7-11, 2020 (5 pages).
Office Action issued in Japanese Application No. 2022-575009, mailed Jan. 7, 2025 (6 pages).
Office Action issued in Japanese Patent Application No. 2022-575009, issued Apr. 22, 2025 (6 pages).

* cited by examiner

*Primary Examiner* — Thomas R Cairns
(74) *Attorney, Agent, or Firm* — Osha Bergman Watanabe & Burton LLP

(57) ABSTRACT

A terminal receives a message of a radio resource control layer and assumes the number of repetitions per resource or format of a physical uplink control channel based on the received message.

7 Claims, 8 Drawing Sheets

FIG. 5

*PUCCH-Config information element*

```
-- ASN1START
-- TAG-PUCCH-CONFIG-START

PUCCH-ResourceSetId ::= INTEGER (0..maxNrofPUCCH-ResourceSets-1)

PUCCH-Resource ::= SEQUENCE {
    pucch-ResourceId        PUCCH-ResourceId,
    startingPRB             PRB-Id,
    intraSlotFrequencyHopping   ENUMERATED                      OPTIONAL,   -- Need R
    secondHopPRB            PRB-                                OPTIONAL,   -- Need R
    nrofSlots               ENUMERATED                          OPTIONAL,   -- Need S
    format                  CHOICE {
        format0                 PUCCH-format0,
        format1                 PUCCH-format1,
        format2                 PUCCH-format2,
        format3                 PUCCH-format3,
        format4                 PUCCH-format4
    }
}
...
}
...
```

FIG. 6

*PUCCH-Config information element*

```
-- ASN1START
-- TAG-PUCCH-CONFIG-START

......

PUCCH-ResourceId ::=         INTEGER (0..maxNrofPUCCH-Resources-1)

PUCCH-format0 ::=            SEQUENCE {
    initialCyclicShift          INTEGER (0..11),
    nrofSymbols                 INTEGER (1..2),
    startingSymbolIndex         INTEGER (0..13)
}

PUCCH-format1 ::=            SEQUENCE {
    initialCyclicShift          INTEGER (0..11),
    nrofSymbols                 INTEGER (4..14),
    nrofSlots                   ENUMERATED                  OPTIONAL, -- Need S
    startingSymbolIndex         INTEGER (0..10),
    timeDomainOCC               INTEGER (0..6)
}

Table 6.2.1-1 Values of LCID for DL-SCH

| Index | LCID values |
|---|---|
| 0 | CCCH |
| 1-32 | Identity of the logical channel |
| 33-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

| R | Serving Cell ID | BWP ID | Oct1 |
|---|---|---|---|
| R | PUCCH Resource ID | | Oct2 |
| S7 | S6 | S5 | S4 | S3 | S2 | S1 | S0 | Oct3 |

| R | Serving Cell ID | BWP ID | Oct1 |
|---|---|---|---|
| R | R | R | S3 | S2 | S1 | S0 | Oct2 | form of a radio resource control layer, and a control
unit (a control unit 270) that assumes the number of repetitions per
TERMINAL AND RADIO BASE STATION

TECHNICAL FIELD

The present disclosure relates to a terminal and a radio base station which support repetitive transmission of a physical uplink control channel.

BACKGROUND ART

The 3rd Generation Partnership Project (3GPP) has specified the 5th generation mobile communication system (also referred to as 5G, New Radio (NR), or Next Generation (NG)), and is also preparing a next-generation system specification called Beyond 5G, 5G Evolution, or 6G.

For example, 3GPP Release-17 agreed to study coverage enhancement (CE) in NR (Non-Patent Literature 1). This study includes signaling to a terminal (User Equipment, UE) to support repetition of physical uplink control channels (PUCCHs).

CITATION LIST

Non-Patent Literature

Non-Patent Literature 1: "New WID on NR coverage enhancements", RP-202928, 3GPP TSG RAN meeting #90e, 3GPP, December 2020

SUMMARY OF THE INVENTION

In the current 3GPP specifications, Repetition number of PUCCH can only be uniformly set, and the Repetition number may not be dynamically changed per PUCCH resource or format.

Accordingly, the following disclosure has been made in view of such a situation, and an object of the disclosure is to provide a terminal and a radio base station that can support the flexible repetition of PUCCH.

One aspect of the present disclosure provides a terminal (UE 200) including: a reception unit (a control signal and reference signal processing unit 240) that receives a message of a radio resource control layer, and a control unit (a control unit 270) that assumes the number of repetitions per resource or format of a physical uplink control channel based on the message.

One aspect of the present disclosure provides a terminal (UE 200) including: a reception unit (a control signal and reference signal processing unit 240) that receives a control element of a medium access control layer, and a control unit (a control unit 270) that assumes the number of repetitions of a physical uplink control channel based on a parameter of the physical uplink control channel included in the control element.

One aspect of the present disclosure provides a terminal (UE 200) including: a reception unit (a control signal and reference signal processing unit 240) that receives downlink control information, and a control unit (a control unit 270) that assumes the number of repetitions of a physical uplink control channel based on a parameter included in the downlink control information.

One aspect of the present disclosure provides a radio base station (for example, gNB 100A) including: a control unit (a control unit 270) that dynamically controls the number of repetitions of a physical uplink control channel, and a transmission unit (a control signal and reference signal processing unit 240) that transmits information of a specific layer indicating the number of repetitions to a terminal (UE 200).

One aspect the present disclosure provides a radio base station (for example, gNB 100A) including: a transmission unit (a control signal and reference signal processing unit 240) that transmits downlink control information for scheduling a physical downlink data channel, and a control unit (a control unit 270) that includes a parameter indicating the number of repetitions of the physical uplink control channel in the downlink control information.

BRIEF DESCRIPTION OF DRAWINGS

FIG. 5 is a diagram showing a configuration example (part 1) of a PUCCH-Config information element according to Operation Example 1.

FIG. 6 is a diagram showing a configuration example (part 2) of a PUCCH-Config information element according to Operation Example 1.

FIG. 7 is a diagram showing a configuration example of a MAC-CE according to Operation Example 2.

DESCRIPTION OF EMBODIMENTS

Figure 1:
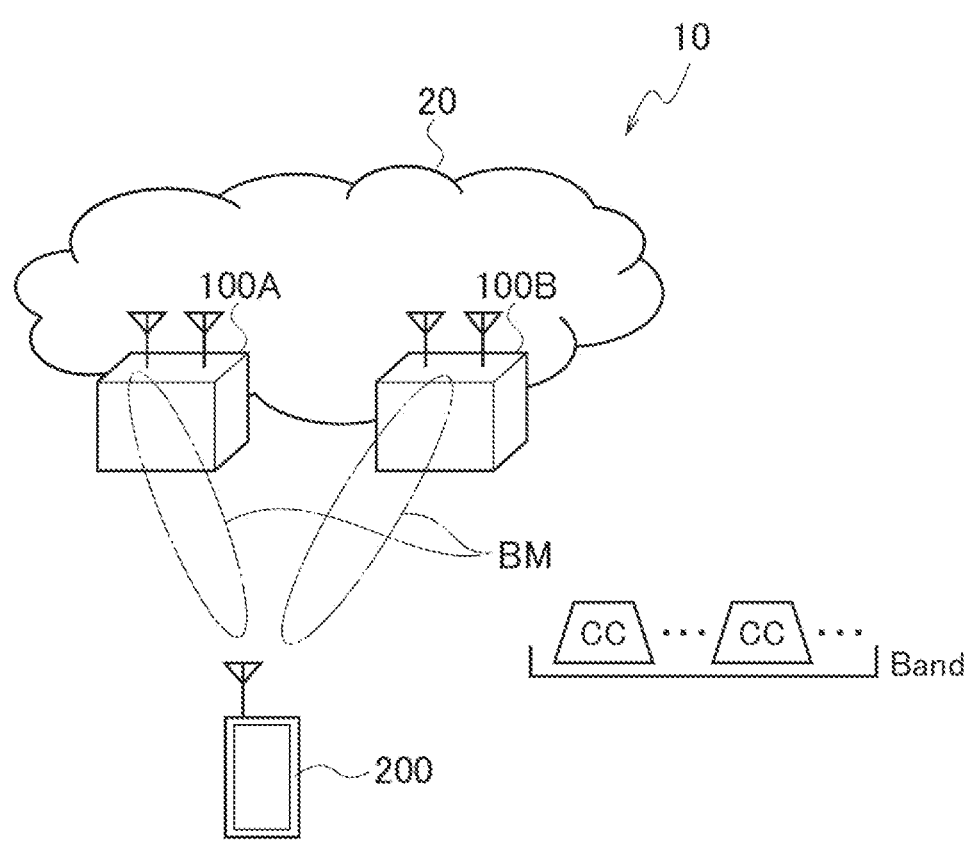
FIG. 1 is an overall schematic configuration diagram of radio communication system 10.

Embodiments will be described below with reference to the accompanying drawings. Note that the same or similar reference numerals have been attached to the same functions and configurations, and the description thereof is omitted as appropriate.

(1) OVERALL SCHEMATIC CONFIGURATION OF RADIO COMMUNICATION SYSTEM

FIG. 1 is an overall schematic configuration diagram of a radio communication system 10 according to the present embodiment. The radio communication system 10 is a radio communication system in accordance with 5G New Radio (NR) and includes a Next Generation-Radio Access Network 20 (hereinafter referred to as NG-RAN 20) and a terminal 200 (User Equipment 200, hereinafter referred to as UE 200).

The radio communication system 10 may be a radio communication system in accordance with a system called Beyond 5G, 5G Evolution or 6G.

The NG-RAN 20 includes a radio base station 100A (hereinafter referred to as gNB 100A) and a radio base station 100B (hereinafter referred to as gNB 100B). The specific configuration of the radio communication system 10 including the number of gNBs and UEs is not limited to the example shown in FIG. 1.

The NG-RAN 20 actually includes a plurality of NG-RAN Nodes, specifically gNBs, and is connected to a 5G-compliant core network (5GC, not shown). The NG-RAN 20 and 5GC may be expressed simply as a "network".

The gNB 100A and the gNB 100B are radio base stations in accordance with NR, and perform radio communication with the UE 200 in accordance with NR. The gNB 100A, gNB 100B, and the UE 200 can support Massive MIMO generating a beam BM with higher directivity by controlling radio signals transmitted from a plurality of antenna elements, Carrier Aggregation (CA) bundling and using a plurality of Component Carriers (CCs), and Dual Connectivity (DC) simultaneously communicating between the UE and each of the plurality of NG-RAN Nodes.

The radio communication system 10 supports FR1 and FR2. The frequency bands of each FR are as follows.

FR1: 410 MHz to 7.125 GHZ

FR 2: 24.25 GHz to 52.6 GHZ

In FR1, Subcarrier Spacing (SCS) of 15, 30, or 60 kHz is used and a bandwidth (BW) of 5 to 100 MHz may be used. FR2 has a higher frequency than FR1, and an SCS of 60 or 120 kHz (240 kHz may be included) may be used therefor, and a bandwidth (BW) of 50 to 400 MHz may be used therefor.

Further, the radio communication system 10 may support a frequency band higher than the frequency band of FR2. Specifically, the radio communication system 10 may support a frequency band exceeding 52.6 GHZ and up to 114.25 GHZ.

Cyclic Prefix-Orthogonal Frequency Division Multiplexing (CP-OFDM)/Discrete Fourier Transform-Spread (DFT-S-OFDM) having larger subcarrier spacing (SCS) may also be applied. Further, DFT-S-OFDM may be applied not only to an uplink (UL) but also to a downlink (DL).

Figure 2:
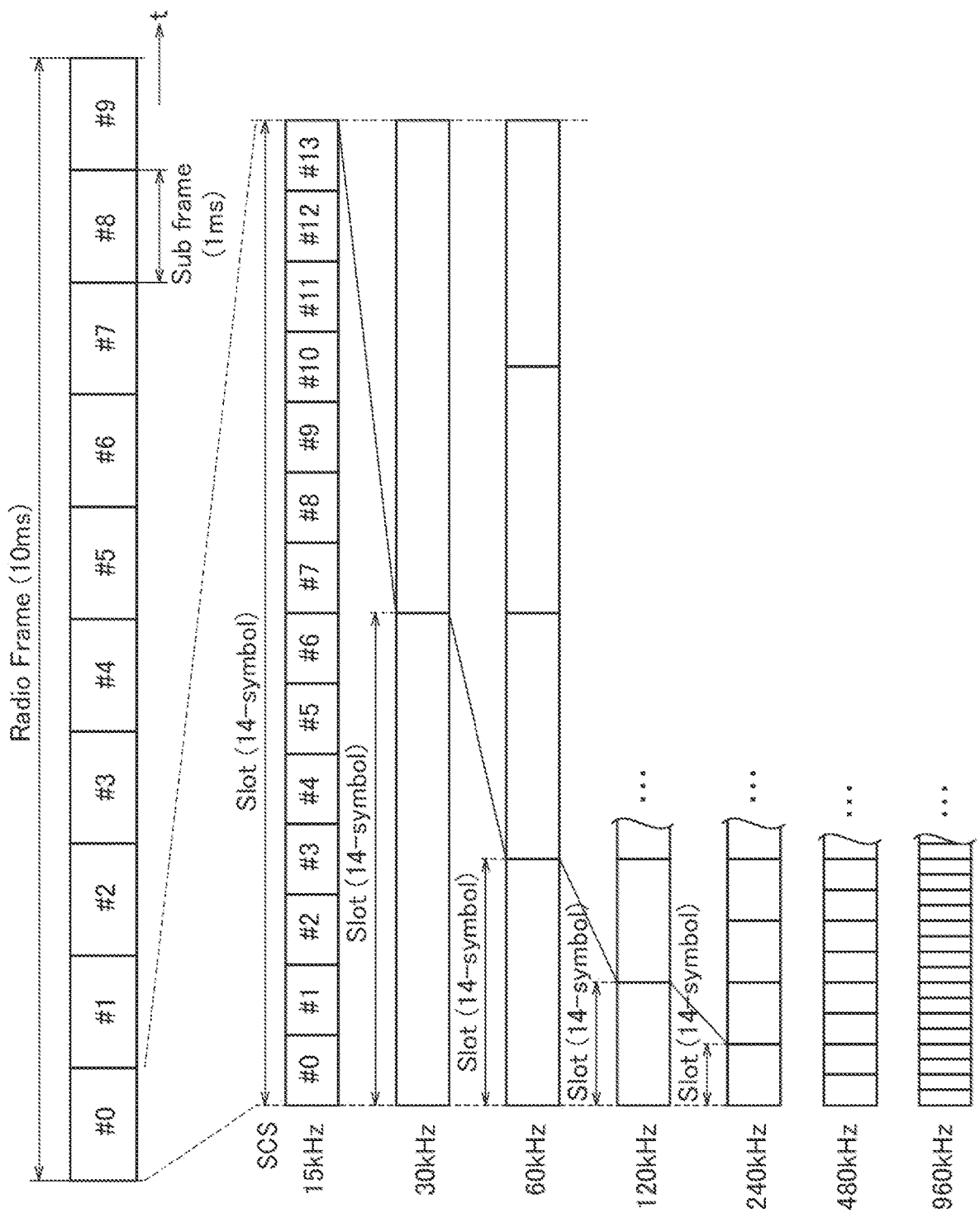
FIG. 2 is a diagram showing a configuration example of a radio frame, a subframe, and a slot used in radio communication system 10.

FIG. 2 shows a configuration example of a radio frame, a subframe, and a slot used in the radio communication system 10.

As shown in FIG. 2, one slot consists of 14 symbols, and the larger (wider) the SCS, the shorter a symbol period (and a slot period). The number of symbols constituting one slot is not necessarily 14 (for example, 28, 56 symbols). The number of slots per subframe may vary depending on SCS. In addition, although not shown in the diagram, for SCS, wider spacing, for example, 480 kHz, 960 kHz, and the like may be used.

The time direction (t) shown in FIG. 2 may be referred to as a time domain, a symbol period, or a symbol time. Further, the frequency direction may also be referred to as a frequency domain, a resource block, a subcarrier, a Bandwidth part (BWP), or the like.

Further, the radio communication system 10 can support a coverage enhancement (CE) that expands the coverage of cells formed by the gNB 100A (and gNB 100B, hereinafter the same). In the coverage enhancement, a mechanism for increasing a receive success rate of various physical channels may be provided.

In the present embodiment, the radio communication system 10 (gNB 100A) can support the repetitive transmission of a physical downlink data channel, specifically, a physical downlink shared channel (PDSCH). Further, the UE 200 can support the repetitive transmission of a physical uplink control channel, specifically, a physical uplink control channel (PUCCH).

(2) FUNCTIONAL BLOCK CONFIGURATION OF RADIO COMMUNICATION SYSTEM

Figure 3:
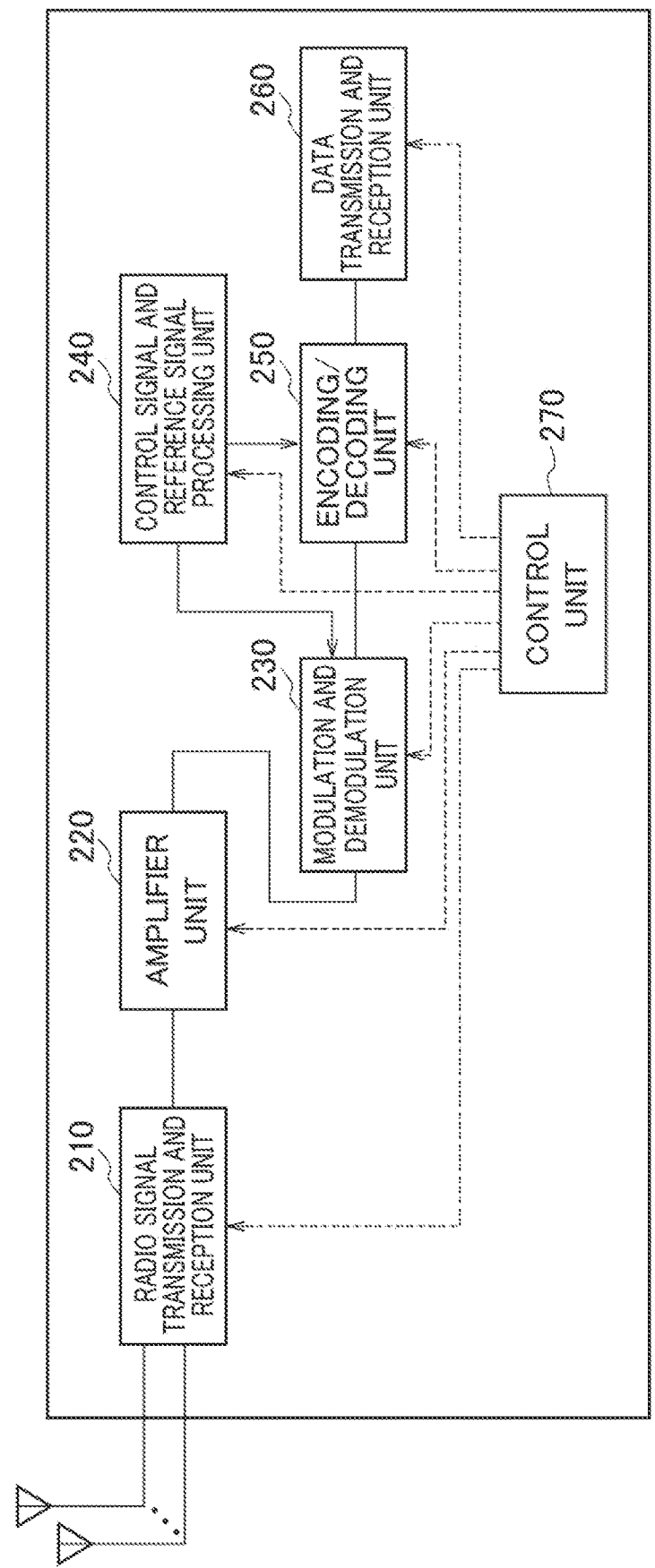
FIG. 3 is a functional block diagram of gNB 100A, gNB 100B, and UE 200.

Next, the functional block configuration of the radio communication system 10 will be described. Specifically, the functional block configuration of the UE 200 will be described. FIG. 3 is a functional block diagram of the gNB 100A, gNB 100B, and UE 200.

Note that FIG. 3 shows only the main functional blocks related to the description of the embodiment, and the UE 200 (gNB 100A, gNB 100B) has other functional blocks (for example, a power supply unit and the like). Further, FIG. 3 shows a functional block configuration of the UE 200, and refer to FIG. 8 for a hardware configuration.

A radio signal transmission and reception unit 210 transmits and receives radio signals in accordance with NR. The radio signal transmission and reception unit 210 supports Massive MIMO, CA bundling and using a plurality of CCs, and DC communicating simultaneously between the UE and each of the two NG-RAN Nodes.

An amplifier unit 220 includes a Power Amplifier (PA)/Low Noise Amplifier (LNA) or the like. The amplifier unit 220 amplifies a signal output from a modulation and demodulation unit 230 to a predetermined power level. Further, the amplifier unit 220 amplifies an RF signal output from the radio signal transmission and reception unit 210.

The modulation and demodulation unit 230 performs data modulation/demodulation, transmission power setting, resource block allocation, and the like for each predetermined communication destination (the gNB 100A or the like). In the modulation and demodulation unit 230, Cyclic Prefix-Orthogonal Frequency Division Multiplexing (CP-OFDM)/Discrete Fourier Transform-Spread (DFT-S-OFDM) may be applied. Further, the DFT-S-OFDM may be used not only in the uplink (UL) but also in the downlink (DL).

A control signal and reference signal processing unit 240 performs processing relating to various control signals transmitted and received by the UE 200 and processing relating to various reference signals transmitted and received by the UE 200.

Specifically, the control signal and reference signal processing unit 240 receives various control signals transmitted from the gNB 100A (or gNB 100B, hereinafter the same) via a predetermined control channel, for example, a control signal of a radio resource control layer (RRC). Further, the control signal and reference signal processing unit 240 transmits various control signals to the gNB 100A via a predetermined control channel.

The control signal and reference signal processing unit 240 performs processing using reference signals (RSS) such as the Demodulation Reference Signal (DMRS) and the Phase Tracking Reference Signal (PTRS).

A DMRS is a terminal-specific reference signal (a pilot signal) known between a base station and a terminal for estimating a fading channel used for data demodulation. A PTRS is a terminal-specific reference signal for the purpose of estimating phase noise, which becomes a problem in a high frequency band.

In addition to DMRS and PTRS, the reference signals may include a Channel State Information-Reference Signal (CSI-RS), a Sounding Reference Signal (SRS), and a Positioning Reference Signal (PRS) for position information.

Further, the channel includes a control channel and a data channel. The control channel includes a Physical Downlink Control Channel (PDCCH), a Physical Uplink Control Channel (PUCCH), a Random Access Channel (RACH), Downlink control information (DCI) including a Random Access Radio Network Temporary Identifier (RA-RNTI), a Physical Broadcast Channel (PBCH), and the like.

The data channel includes Physical Downlink Shared Channel (PDSCH), Physical Uplink Shared Channel (PUSCH), and the like. The data may refer to data transmitted via the data channel.

Further, the physical channel may include at least PDCCH, PUCCH, PUSCH and PDSCH.

The control signal and reference signal processing unit 240 can receive radio resource control layer (RRC) messages, as described above. In the present embodiment, the control signal and reference signal processing unit 240 may constitute a reception unit. Specifically, the control signal and reference signal processing unit 240 can receive RRC Reconfiguration and the like.

Further, the control signal and reference signal processing unit 240 can receive a control element (MAC-CE) of a medium access control layer (MAC), as described above. Specifically, the control signal and reference signal processing unit 240 can receive a MAC-CE including setting (which may be parameters) of a PUCCH resource.

Further, the control signal and reference signal processing unit 240 can receive downlink control information (DCI), particularly DCI (which may be referred to as a scheduling DCI) for scheduling a physical downlink data channel (PDSCH), as described above. Specifically, the control signal and reference signal processing unit 240 can receive a DCI in accordance with a defined DCI format (for example, DCI format 1_0/1_1/1_2).

The configuration of RRC signaling, MAC-CE and DCI will be described later.

Further, the control signal and reference signal processing unit 240 can transmit capability information (UE Capability Information) indicating the capability of the UE 200 to the network. In the present embodiment, the control signal and reference signal processing unit 240 may constitute a transmission unit.

In particular, in the present embodiment, the control signal and reference signal processing unit 240 can transmit the capability information of UE 200 regarding Repetition of the physical uplink control channel (PUCCH). Specifically, the control signal and reference signal processing unit 240 can transmit UE Capability information indicating the supportability regarding Repetition of PUCCH. Details of the UE Capability information will be described later.

An encoding/decoding unit 250 performs data division/connection, channel coding/decoding, and the like for each predetermined communication destination (the gNB 100A and the like).

Specifically, the encoding/decoding unit 250 divides the data output from the data transmission and reception unit 260 into predetermined sizes, and performs channel coding on the divided data. The encoding/decoding unit 250 decodes the data output from the modulation and demodulation unit 230 and connects the decoded data.

The data transmission and reception unit 260 transmits and receives a Protocol Data Unit (PDU) and a Service Data Unit (SDU). Specifically, the data transmission and reception unit 260 performs assembly/disassembly and the like of PDUs/SDUs in a plurality of layers (a medium access control layer (MAC), a radio link control layer (RLC), and a packet data convergence protocol layer (PDCP), and the like). Further, the data transmission and reception unit 260, based on a hybrid automatic repeat request (ARQ), performs data error correction and retransmission control.

A control unit 270 controls each functional block configuring the UE 200. In particular, in the present embodiment, the control unit 270 can perform various controls on the physical channel to support coverage enhancement (CE).

Specifically, the control unit 270 can assume the number of repetitions (which may be referred to as the repetition number) per PUCCH resource or format (PUCCH resource/format) based on an RRC message received by means of the control signal and reference signal processing unit 240.

Specifically, the control unit 270 may assume (may be read as an expectation, decision, or the like) the repetition number based on the contents of fields (may be referred to as nrofSlots) included in the PUCCH-Config information element (see 3GPP TS38.331). It is assumed that Repetition of PUCCH is performed in the time direction, but Repetition in the frequency direction is not excluded.

Further, the control unit 270 may assume the Repetition number of PUCCH based on the PUCCH parameters included in the received MAC-CE. Specifically, if PUCCH spatial relation Activation/Deactivation or SP CSI (Semi-Persistent Channel State Information) reporting on PUCCH Activation/Deactivation is set by the MAC-CE, whether Repetition of PUCCH is present and/or Repetition number of PUCCH may be indicated from the network in combination with these.

Further, the control unit 270 may assume Repetition number of the PUCCH based on the parameters included in the DCI. Specifically, if PDSCH is scheduled by DCI, whether Repetition is present and/or Repetition number may be indicated in addition to the PUCCH resource indicator and the PDSCH-to-HARQ (Hybrid Automatic repeat request) feedback timing indicator (k).

The functions related to the dynamic Repetition of PUCCH described above may also be provided in the gNB 100A (and/or gNB 100B, hereinafter the same).

The gNB 100A (the radio base station) may include the control unit 270 that dynamically controls the number of repetitions of PUCCH and the transmission unit (the control signal and reference signal processing unit 240) that transmits, to the UE 200, information on a specific layer (RRC, MAC, or PHY) indicating the number of repetitions, for example.

Further, the gNB 100A may include the transmission unit (the control signal and reference signal processing unit 240) that transmits downlink control information (DCI) for scheduling a physical downlink data channel (PDSCH) and the control unit 270 that includes a parameter indicating the number of repetitions of PUCCH in the downlink control information.

(3) OPERATION OF RADIO COMMUNICATION SYSTEM

Next, the operation of the radio communication system 10 will be described. Specifically, a description will be given regarding an operation related to repetitive transmission of the physical uplink control channel (PUCCH) corresponding to the coverage enhancement (CE).

(3.1) Premises

In the current 3GPP specification, for Repetition number of PUCCH, only a single setting is possible and dynamic setting is not possible. Specifically, only the same number of repetitions can be uniformly set for PUCCH resource and PUCCH format. More specifically, the field of nrofSlots included in the PUCCH-Config information element is used.

In this way, since only uniform setting is possible, it is not possible to change Repetition number per PUCCH resource or change Repetition number per PUCCH format according to the antenna beam (beam BM) of the radio base station, for example.

Further, Repetition number may not be set dynamically in response to events.

(3.2) Operation Overview

A description will be given regarding an operation related to the dynamic setting of the different number of repetitions per PUCCH resource/format by eliminating the above-described restriction on Repetition of PUCCH below. Specifically, the following Operation Examples will be described.

Figure 4:
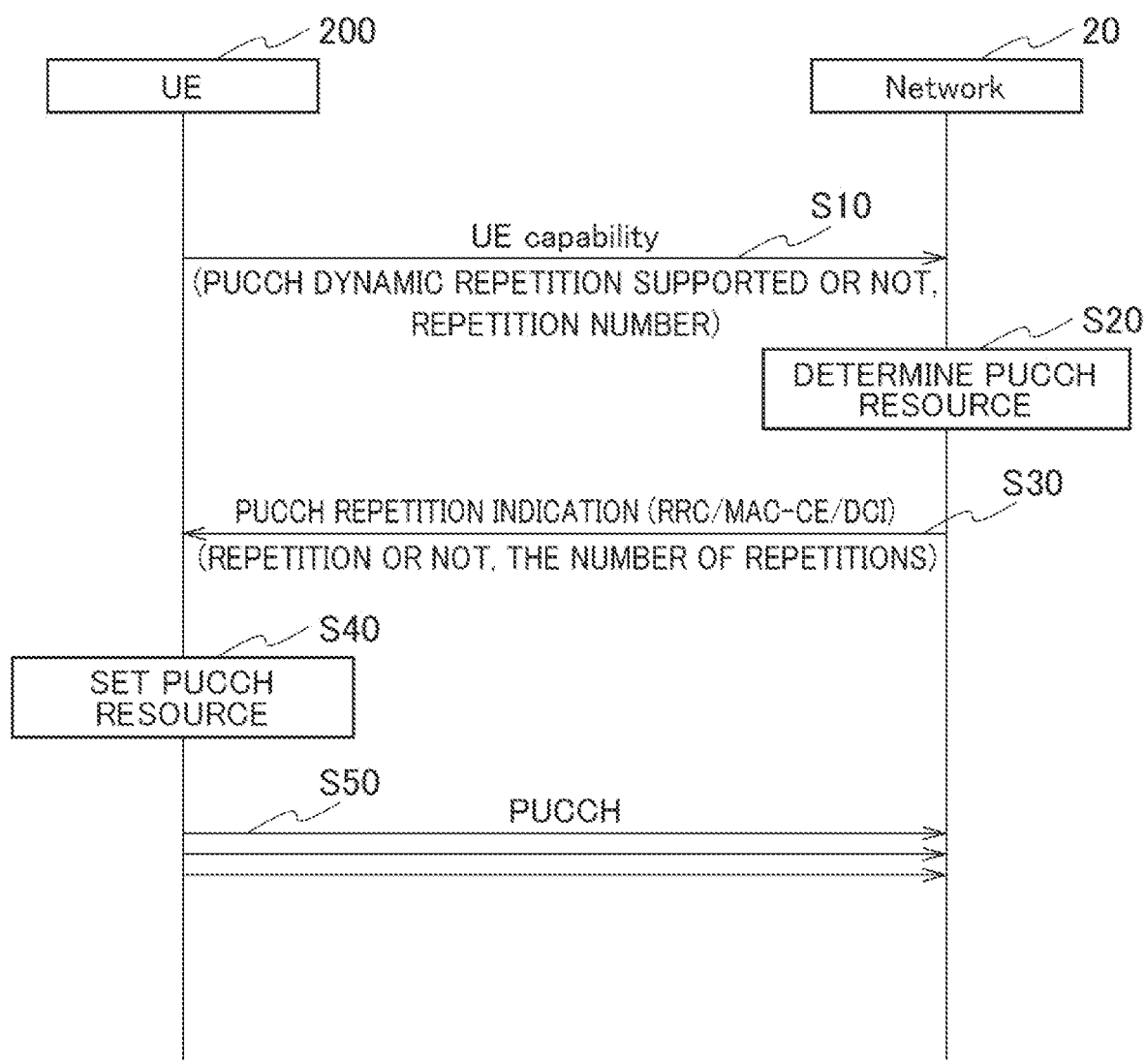
FIG. 4 is a diagram showing a schematic communication sequence according to an operation example.

(Operation Example 1): In RRC, the different number of repetitions is set for each PUCCH resource.
(Operation Example 2): When MAC-CE is used to set PUCCH spatial relation Activation/Deactivation or SP CSI reporting on PUCCH Activation/Deactivation, whether Repetition is present and/or the number of repetitions are set (indicated).
(Operation Example 3): When PDSCH is scheduled by DCI, in addition to the PUCCH resource indicator and the PDSCH-to-HARQ feedback timing indicator (k), whether Repetition is present and/or the number of repetitions are set (indicated).
(Operation Example 4): The UE reports Capability regarding supportability for Dynamic indication of PUCCH Repetition FIG. 4 shows a schematic communication sequence according to the operation examples. As shown in FIG. 4, the UE 200 can notify the network (the NG-RAN 20) of the capability (UE Capability information) related to the PUCCH Repetition (S10). This capability may include the supportability of dynamic Repetition setting of PUCCH, Repetition number that can be supported, and the like. Specific examples of such capabilities will be described later.

The network may determine the resource to which the PUCCH is allocated based on the notified capability information (S20). The determination may include a setting for the PUCCH Repetition.

The network may indicate the UE 200 about the setting contents related to PUCCH Repetition based on the determination result of the PUCCH resource (S30). As described above, RRC, MAC, or DCI may be used for the indication.

The UE 200 may set the PUCCH resource based on the indication (S40). The setting may include contents related to the PUCCH Repetition.

The UE 200 may repeatedly transmit the PUCCH according to the setting (S50).

(3.3) Operation Examples

Next, Operation Examples 1 to 4 will be described in detail.

(3.3.1) Operation Example 1

In this operation example, when the PUCCH resource is set by using the signaling of the RRC, the number of repetitions may be set for each PUCCH resource.

FIGS. 5 and 6 show a configuration example of the PUCCH-Config information element according to Operation Example 1. Specifically, as shown in FIG. 5, nrofSlots (see underlined portion) may be added to the PUCCH-Resource field. The nrofSlots may indicate Repetition number of PUCCH. Accordingly, the different repetition number may be set for each pucch-ResourceId.

Alternatively, as shown in FIG. 6, nrofSlots may be added to the field for each PUCCH-format.

In this case, it is not necessary to change the configuration of the MAC CE and the DCI format 1_0/1_1. Specifically, in the case of MAC-CE, if "SP CSI reporting on PUCCH Activation/Deactivation" is set, the CSI-ReportConfig associated with the PUCCH resource indicator may be set, for example.

In the case of DCI format 1_0/1_1/1_2, the PUCCH resource indicator may be set.

(3.3.2) Operation Example 2

In this operation example, when PUCCH spatial relation Activation/Deactivation or SP CSI reporting on PUCCH Activation/Deactivation is set by using MAC-CE, whether Repetition of PUCCH is present and/or the number of repetitions of PUCCH may be indicated.

FIG. 7 shows a configuration example of the MAC-CE according to Operation Example 2. As shown in FIG. 7, whether Repetition of PUCCH is present and/or the number of repetitions of PUCCH may be indicated by using the Reserved bit of PUCCH spatial relation Activation/Deactivation or SP CSI reporting on PUCCH Activation/Deactivation, for example.

Alternatively, when the PUCCH resource indicator is set in the reportConfigId of the CSI-ReportConfig by the signaling of the RRC, the different repetition number may be set for each reportConfigId. Alternatively, a field may be added to set Repetition number of PUCCH by using the Reserved index of the MAC-CE.

If Repetition number of PUCCH is not set by the MAC-CE, Repetition number of PUCCH set by the signaling of the RRC may be set as a default value. Alternatively, if both are set, the setting by MAC-CE or RRC may take precedence.

(3.3.3) Operation Example 3

In this operation example, in addition to the PUCCH resource indicator and/or the PDSCH-to-HARQ feedback timing indicator (k), whether Repetition is present and/or the number of repetitions may be set by the DCI.

Specifically, the configuration of DCI format 1_0/1_1/1_2 may be maintained, and the values of existing fields may be replaced. For example, the first one bit of the PUCCH resource indicator (3 bits) or the PDSCH-to-HARQ feedback timing indicator (k) (3 bits) may be used to set the PUCCH resource indicator, and the last two bits may be used to set Repetition number.

The replacement of the field may be notified to the UE 200 by using at least any one of RRC, MAC-CE, and DCI.

Alternatively, a new DCI format may be defined that is different from the existing DCI format. A DCI format with additional fields for setting whether Repetition of PUCCH is present and/or Repetition number may be defined, for example.

Further, when dynamic Repetition setting of PUCCH by RRC, MAC-CE, and DCI is indicated, the newest indication may be applied or any one of the indications may be preferentially applied, for example.

(3.3.4) Operation Example 4

In this operation example, the UE 200 may report, to the network, the following Capability regarding the supportability with respect to Repetition of PUCCH, for example.

Applicability of Repetition Dynamic indication
Applicability of MAC-CE with Repetition number
Supportability of a new DCI format with Repetition number The UE 200 may report the frequency band (which may simply be referred to as a frequency or band) which the UE 200 supports by means of any one of the following methods.

Supportability for all frequencies all at once (supportability as a mobile station)
Supportability per frequency
Supportability of each FR1/FR2

The UE 200 may report a duplex operation which the UE 200 supports by means of any one of the following methods.

Supportability as UE
Supportability per duplex operation (TDD/FDD)

(4) ACTION AND EFFECT

According to the embodiment described above, the following effects can be obtained. Specifically, the UE 200 can assume the number of repetitions (which may be referred to as Repetition number) per PUCCH resource or format (PUCCH resource/format) based on the RRC message received from the radio base station (for example, gNB 100A).

In addition, the UE 200 may assume Repetition number of PUCCH based on the parameters of PUCCH included in the MAC-CE received from the radio base station.

Furthermore, the UE 200 may assume Repetition number of PUCCH based on the parameters included in the DCI.

Therefore, Repetition number can be dynamically changed per PUCCH resource or format, and it is possible to support flexible Repetition of PUCCH.

In the present embodiment, the UE 200 can transmit capability information of the UE 200 (UE Capability information) on Repetition of PUCCH. Accordingly, the network can reliably set an appropriate Repetition of PUCCH according to the capability regarding PUCCH of the UE 200.

(5) OTHER EMBODIMENTS

Although the embodiment has been described above, it is obvious to those skilled in the art that various modifications and improvements are possible without being limited to the description of the embodiment.

Although PUCCH has been described as the physical uplink control channel in the above-described embodiment, it is not necessarily required to be PUCCH as long as it is a control channel (physical channel) in the uplink (UL), for example.

The block diagram (FIG. 3) used in the description of the above-described embodiment shows blocks in units of functions. Those functional blocks (components) can be realized by a desired combination of at least one of hardware and software. A realization method for each functional block is not particularly limited. That is, each functional block may be realized by using one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that makes a transmitting function work is called a transmitting unit or a transmitter. For any of the above, as described above, the realization method is not particularly limited.

Figure 8:
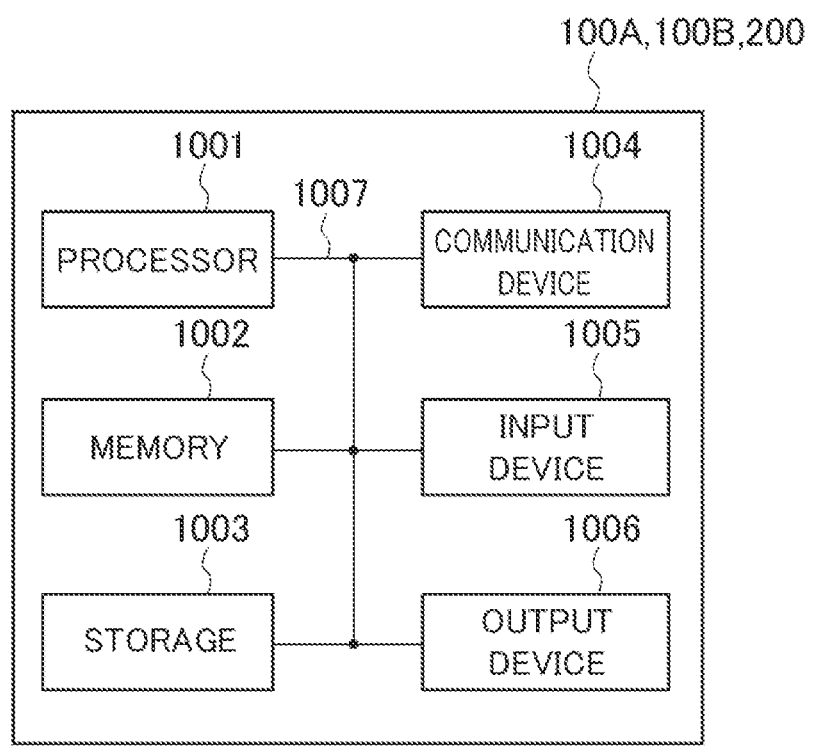
FIG. 8 is a diagram showing an example of a hardware configuration of gNB 100A, gNB 100B, and UE 200.

Further, the above-described gNB 100A, gNB 100B, and UE 200 (the device) may function as a computer that performs processing of a radio communication method of the present disclosure. FIG. 8 is a diagram showing an example of a hardware configuration of the device. As shown in FIG. 8, the device may be configured as a computer device including a processor 1001, a memory 1002, a storage 1003, a communication device 1004, an input device 1005, an output device 1006, a bus 1007, and the like.

Furthermore, in the following description, the term "device" can be substituted with circuit, device, unit, or the like. The hardware configuration of the device may include one or more devices shown in the figure or may not include some of the devices.

Each of the functional blocks of the device (see FIG. 3) is implemented by means of any of hardware elements of the computer device or a combination of the hardware elements.

In addition, each function in the device is realized by loading predetermined software (programs) on hardware such as the processor 1001 and the memory 1002 so that the processor 1001 performs arithmetic operations to control communication via the communication device 1004 and to control at least one of reading and writing of data on the memory 1002 and the storage 1003.

The processor 1001 operates, for example, an operating system to control the entire computer. The processor 1001 may be configured with a Central Processing Unit (CPU) including interfaces with peripheral devices, control devices, arithmetic devices, registers, and the like.

Moreover, the processor 1001 reads a program (program code), a software module, data, and the like from at least one of the storage 1003 and the communication device 1004 into the memory 1002, and executes various processes according to these. As the program, a program causing the computer to execute at least part of the operation described in the above embodiment is used. Alternatively, various processes described above can be executed by one processor 1001 or can be executed simultaneously or sequentially by two or more processors 1001. The processor 1001 can be implemented by using one or more chips. Alternatively, the program may be transmitted from a network via a telecommunication line.

The memory 1002 is a computer readable recording medium and may be configured, for example, with at least one of a Read Only Memory (ROM), Erasable Programmable ROM (EPROM), Electrically Erasable Programmable ROM (EEPROM), Random Access Memory (RAM), and the like. The memory 1002 may be referred to as a register, cache, main memory (main storage device), and the like. The memory 1002 may store therein programs (program codes), software modules, and the like that can execute the method according to one embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (registered trademark) disk), a smart card, a flash memory (for example, a card, a stick, a key drive), a floppy (registered trademark) disk, a magnetic strip, and the like. The storage 1003 can be referred to as an auxiliary storage device. The recording medium can be, for example, a database including at least one of the memory 1002 and the storage 1003, a server, or other appropriate medium.

The communication device 1004 is hardware (transmission/reception device) capable of performing communication between computers via at least one of a wired network and a wireless network. The communication device 1004 is also referred to as, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may have an integrated configuration (for example, a touch screen).

Also, the respective devices such as the processor 1001 and the memory 1002 are connected to each other with the bus 1007 for communicating information. The bus 1007 may be constituted by a single bus or may be constituted by different buses for each device-to-device.

Further, the device may be configured to include hardware such as a microprocessor, a Digital Signal Processor (DSP), an Application Specific Integrated Circuit (ASIC), a Programmable Logic Device (PLD), and a Field Programmable Gate Array (FPGA). Some or all of these functional blocks may be realized by means of this hardware. For example, the processor 1001 may be implemented by using at least one of the above-described items of hardware.

Further, notification of information is not limited to that in the aspect/embodiment described in the present disclosure, and may be performed by using other methods. For example, notification of information may be performed by physical layer signaling (for example, Downlink Control Information (DCI), Uplink Control Information (UCI)), higher layer signaling (for example, RRC signaling, Medium Access Control (MAC) signaling), broadcast information (Master Information Block (MIB), System Information Block (SIB)), other signals, or a combination thereof. The RRC signaling may also be referred to as an RRC message, for example, or may be an RRC Connection Setup message, an RRC Connection Reconfiguration message, or the like.

Each aspect/embodiment described in the present disclosure can be applied to at least one of Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), a system using any other appropriate system, and a next-generation system that is expanded based on these. Further, a plurality of systems may be combined (for example, a combination of at least one of LTE and LTE-A with 5G) and applied.

The order of the processing procedures, sequences, flowcharts, and the like of each aspect/embodiment described in the present disclosure may be exchanged as long as there is no contradiction. For example, the methods described in the present disclosure present the elements of the various steps by using an exemplary order and are not limited to the presented specific order.

The specific operation that is performed by a base station in the present disclosure may be performed by its upper node in some cases. In a network constituted by one or more network nodes having a base station, it is obvious that the various operations performed for communication with the terminal may be performed by at least one of the base station and other network nodes other than the base station (for example, an MME, an S-GW, and the like may be considered, but there is not limited thereto). In the above, an example in which there is one network node other than the base station is explained; however, a combination of a plurality of other network nodes (for example, an MME and an S-GW) may be used.

Information and signals (information and the like) can be output from a higher layer (or lower layer) to a lower layer (or higher layer). These may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by using a value (0 or 1) represented by one bit, by truth-value (Boolean: true or false), or by comparison of numerical values (for example, comparison with a predetermined value).

Each of the aspects/embodiment described in the present disclosure may be used separately or in combination, or may be switched in accordance with the execution. In addition, notification of predetermined information (for example, notification of "is X") is not limited to being performed explicitly, and it may be performed implicitly (for example, without notifying the predetermined information).

Regardless of being referred to as software, firmware, middleware, microcode, hardware description language, or some other name, software should be interpreted broadly to mean instructions, an instruction set, code, a code segment, program code, a program, a subprogram, a software module, an application, a software application, a software package, a routine, a subroutine, an object, an executable file, an execution thread, a procedure, a function, and the like.

Further, software, instruction, information, and the like may be transmitted and received via a transmission medium. For example, when software is transmitted from a website, a server, or another remote source by using at least one of a wired technology (a coaxial cable, an optical fiber cable, a twisted pair cable, a Digital Subscriber Line (DSL), or the like) and a wireless technology (infrared light, microwave, or the like), then at least one of these wired and wireless technologies is included within the definition of the transmission medium.

Information, signals, or the like described in the present invention may be represented by using any of a variety of different technologies. For example, data, an instruction, a command, information, a signal, a bit, a symbol, a chip, or the like that may be mentioned throughout the above description may be represented by a voltage, a current, an electromagnetic wave, a magnetic field or magnetic particles, an optical field or photons, or a desired combination thereof.

It should be noted that the terms described in the present disclosure and terms necessary for understanding the present disclosure may be replaced with terms having the same or similar meanings. For example, at least one of a channel and a symbol may be a signal (signaling). A signal may also be a message. Further, a Component Carrier (CC) may be referred to as a carrier frequency, a cell, a frequency carrier, or the like.

The terms "system" and "network" used in the present disclosure can be used interchangeably.

Furthermore, information, parameters, and the like described in the present disclosure can be represented by an absolute value, can be represented by a relative value from a predetermined value, or can be represented by corresponding other information. For example, a radio resource can be indicated using an index.

Names used for the above parameters are not restrictive names in any respect. In addition, formulas and the like using these parameters may be different from those explicitly disclosed in the present disclosure. Since the various channels (for example, a PUCCH, a PDCCH, or the like) and information elements can be identified by any suitable names, the various names allocated to these various channels and information elements shall not be restricted in any way.

In the present disclosure, the terms such as "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. A base station may also be referred to with a term such as a macro cell, a small cell, a femtocell, or a pico cell.

A base station can accommodate one or more (for example, three) cells (also referred to as sectors). In a configuration in which a base station accommodates a plurality of cells, the entire coverage area of the base station can be divided into a plurality of smaller areas. In each of the smaller areas, a communication service can be provided by a base station subsystem (for example, a small base station for indoor use (remote radio head: RRH)).

The term "cell" or "sector" refers to a part or all of the coverage area of at least one of a base station and a base station subsystem that performs a communication service in this coverage.

In the present disclosure, the terms such as "mobile station (Mobile Station: MS)", "user terminal", "user equipment (User Equipment: UE)", and "terminal" can be used interchangeably.

A mobile station may be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms by those skilled in the art.

At least one of a base station and a mobile station may be called a transmitting device, a receiving device, a communication device, or the like. Note that at least one of a base station and a mobile station may be a device mounted on a moving body, a moving body itself, or the like. The moving body may be a vehicle (for example, a car, an airplane, or the like), an unmanned moving body (a drone, a self-driving car, or the like), or a robot (manned type or unmanned type). At least one of a base station and a mobile station also includes a device that does not necessarily move during the communication operation. For example, at least one of a base station and a mobile station may be an Internet of Things (IoT) device such as a sensor.

Also, a base station in the present disclosure may be substituted with a mobile station (user terminal, hereinafter the same). For example, each aspect/embodiment of the present disclosure may be applied to a configuration in which communication between a base station and a mobile station is replaced with communication between a plurality of mobile stations (for example, this may be called Device-to-Device (D2D), Vehicle-to-Everything (V2X), or the like). In this case, the mobile station may have the function of a base station. In addition, words such as "uplink" and "downlink" may also be substituted with words corresponding to inter-terminal communication (for example, "side"). For example, an uplink channel, a downlink channel, or the like may be substituted with a side channel.

Similarly, the mobile station in the present disclosure may be read as a base station. In this case, the base station may have the function of the mobile station. A radio frame may be composed of one or more frames in the time domain. Each of the one or more frames in the time domain may be referred to as a subframe. A subframe may be further composed of one or more slots in the time domain. The subframe may be a fixed time length (for example, 1 ms) independent of the numerology.

The numerology may be a communication parameter applied to at least one of transmission and reception of a certain signal or channel. The numerology may indicate at least one of, for example, subcarrier spacing (SCS), bandwidth, symbol length, cyclic prefix length, transmission time interval (TTI), the number of symbols per TTI, radio frame configuration, a specific filtering process performed by a transceiver in the frequency domain, a specific windowing process performed by a transceiver in the time domain, and the like.

A slot may be composed pf one or more symbols (Orthogonal Frequency Division Multiplexing (OFDM)) symbols, Single Carrier Frequency Division Multiple Access (SC-FDMA) symbols, and the like) in the time domain. A slot may be a unit of time based on the numerology.

A slot may include a plurality of minislots. Each minislot may be composed of one or more symbols in the time domain. A minislot may be called a subslot. A minislot may be composed of fewer symbols than slots. A PDSCH (or PUSCH) transmitted in time units greater than the minislot may be referred to as a PDSCH (or PUSCH) mapping type A. A PDSCH (or PUSCH) transmitted using a minislot may be referred to as a PDSCH (or PUSCH) mapping type B.

Each of a radio frame, subframe, slot, minislot, and symbol represents a time unit for transmitting a signal. A radio frame, subframe, slot, minislot, and symbol may have respectively different names corresponding to them.

For example, one subframe may be called a transmission time interval (TTI), a plurality of consecutive subframes may be called a TTI, and one slot or one minislot may be called a TTI. That is, at least one of the subframe and TTI may be a subframe (1 ms) in the existing LTE, a period shorter than 1 ms (for example, 1-13 symbols), or a period longer than 1 ms. Note that, a unit representing TTI may be called a slot, a minislot, or the like instead of a subframe.

Here, a TTI refers to the minimum time unit of scheduling in radio communication, for example. For example, in the LTE system, the base station performs scheduling for allocating radio resources (frequency bandwidth, transmission power, and the like that can be used in each user terminal) to each user terminal in units of TTI. The definition of TTI is not limited to this.

A TTI may be a transmission time unit such as a channel-encoded data packet (transport block), a code block, or a code word, or may be a processing unit such as scheduling or link adaptation. When a TTI is given, a time interval (for example, the number of symbols) in which a transport block, a code block, a code word, and the like are actually mapped may be shorter than TTI.

When one slot or one minislot is called a TTI, one or more TTIs (that is, one or more slots or one or more minislots) may be the minimum time unit of the scheduling. The number of slots (minislot number) constituting the minimum time unit of the scheduling may be controlled.

A TTI having a time length of 1 ms may be referred to as an ordinary TTI (TTI in LTE Rel. 8-12), a normal TTI, a long TTI, an ordinary subframe, a normal subframe, a long subframe, a slot, and the like. A TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, and the like) may be read as a TTI having a time length exceeding 1 ms, and a short TTI (for example, shortened TTI) may be read as a TTI having a TTI length of less than a TTI length of a long TTI and a TTI length of 1 ms or more.

A resource block (RB) is a resource allocation unit in the time domain and the frequency domain, and may include one or more consecutive subcarriers in the frequency domain. The number of subcarriers included in the RB may be the same regardless of the numerology, and may be 12, for example. The number of subcarriers included in the RB may be determined based on the numerology.

Further, the time domain of an RB may include one or more symbols, and may have a length of 1 slot, 1 minislot, 1 subframe, or 1 TTI. Each TTI, subframe, or the like may be composed of one or more resource blocks.

Note that, one or more RBs may be called a physical resource block (PRB), a sub-carrier group (SCG), a resource element group (REG), a PRB pair, a RB pair, and the like.

A resource block may be configured by one or more resource elements (REs). For example, one RE may be a radio resource domain of one subcarrier and one symbol.

A bandwidth part (BWP) (which may be called a partial bandwidth or the like) may represent a subset of consecutive common resource blocks (RBs) for a certain numerology in a certain carrier. Here, the common RB may be specified by an index of the RB based on the common reference point of the carrier. A PRB may be defined in a certain BWP and numbered within that BWP.

A BWP may include a BWP for UL (UL BWP) and a BWP for DL (DL BWP). One or more BWPs may be set in one carrier for the UE.

At least one of the configured BWPs may be active, and the UE does not have to expect to transmit and receive predetermined signals/channels outside the active BWP. Note that "cell", "carrier", and the like in this disclosure may be read as "BWP".

The above-described structures such as a radio frame, a subframe, a slot, a minislot, and a symbol are merely examples. For example, structures such as the number of subframes included in a radio frame, the number of slots per subframe or radio frame, the number of minislots included in a slot, the number of symbols and RBs included in a slot or minislot, the number of subcarriers included in RBs, and the number of symbols included in a TTI, a symbol length, the cyclic prefix (CP) length, and the like can be changed in various manner.

The terms "connected", "coupled", or any variations thereof mean any direct or indirect connection or coupling between two or more elements, and can include that one or more intermediate elements are present between two elements that are "connected" or "coupled" to each other. The coupling or connection between the elements may be physical, logical, or a combination thereof. For example, "connection" may be substituted with "access". In the present disclosure, two elements can be "connected" or "coupled" to each other by using at least one of one or more wires, one or more cables, and one or more printed electrical connections, and as some non-limiting and non-exhaustive examples, by using electromagnetic energy having wavelengths in the radio frequency domain, a microwave region, and a light (both visible and invisible) region, and the like.

A reference signal may be abbreviated as RS and may be called a pilot according to applicable standards.

As used in the present disclosure, the phrase "based on" does not mean "based only on" unless explicitly stated otherwise. In other words, the phrase "based on" means both "based only on" and "based at least on".

"Means" in the configuration of each device above may be replaced with "unit", "circuit", "device", and the like.

Any reference to elements using a designation such as "first", "second", or the like used in the present disclosure generally does not limit the amount or order of those elements. Such designations can be used in the present disclosure as a convenient method to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive-OR.

Throughout the present disclosure, for example, during translation, if articles such as a, an, and the in English are added, the present disclosure may include that a noun following these articles is used in plural.

As used in this disclosure, the term "determining" may encompass a wide variety of actions. "determining" includes deeming that determining has been performed by, for example, judging, calculating, computing, processing, deriving, investigating, searching (looking up, search, inquiry) (for example, searching in a table, database, or another data structure), ascertaining, and the like. In addition, "determining" can include deeming that determining has been performed by receiving (for example, receiving information), transmitting (for example, transmitting information), inputting (input), outputting (output), access (accessing) (for example, accessing data in a memory), and the like. In addition, "determining" can include deeming that determining has been performed by resolving, selecting, choosing, establishing, comparing, and the like. That is, "determining" may include deeming that "determining" regarding some action has been performed. Moreover, "determining" may be read as "assuming", "expecting", "considering", and the like.

In the present disclosure, the wording "A and B are different" may mean "A and B are different from each other". It should be noted that the wording may mean "A and B are each different from C". Terms such as "separate", "couple", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100 gNB
200 UE
210 Radio signal transmission and reception unit
220 Amplifier unit
230 Modulation and demodulation unit
240 Control signal and reference signal processing unit
250 Encoding/decoding unit
260 Data transmission and reception unit
270 Control unit
1001 Processor
1002 Memory
1003 Storage
1004 Communication device
1005 Input device
1006 Output device
1007 Bus

The invention claimed is:

1. A terminal comprising:
a reception unit that receives downlink control information indicating a resource used in repetitive transmission of a physical uplink control channel; and
a transmission unit that performs the repetitive transmission using the resource, with the number of repetitions of the physical uplink control channel configured per resource in a radio resource control layer.

2. The terminal according to claim 1, wherein
the number of repetitions is included in an information element of the radio resource control layer.

3. The terminal according to claim 1, wherein
the number of repetitions is configured to be different per identification information of the resource.

4. The terminal according to claim 1, wherein
the transmission unit transmits capability information of the terminal related to applicability of a dynamic indication of the repetitive transmission.

5. A radio base station comprising:
a transmission unit that transmits downlink control information indicating a resource used in repetitive transmission of a physical uplink control channel; and
a control unit that configures the number of repetitions of the physical uplink control channel per resource in a radio resource control layer in order for a terminal to perform the repetitive transmission using the resource.

6. A radio communication system including a terminal and a radio base station, wherein
the radio base station comprises:
a transmission unit that transmits downlink control information indicating a resource used in repetitive transmission of a physical uplink control channel; and
a control unit that configures the number of repetitions of the physical uplink control channel per resource in a radio resource control layer in order for the terminal to perform the repetitive transmission using the resource, and
the terminal comprises:
a reception unit that receives the downlink control information; and
a transmission unit that performs the repetitive transmission using the resource, with the number of repetitions.

7. A radio communication method comprising:
receiving downlink control information indicating a resource used in repetitive transmission of a physical uplink control channel; and
performing the repetitive transmission using the resource, with the number of repetitions of the physical uplink control channel configured per resource in a radio resource control layer.

* * * * *